No. 790,079. Patented May 16, 1905.

UNITED STATES PATENT OFFICE.

ROBERT E. SCHMIDT AND ARNOLD FISCHER, OF ELBERFELD, GERMANY, ASSIGNORS TO FARBENFABRIKEN OF ELBERFELD CO., OF NEW YORK, N. Y., A CORPORATION OF NEW YORK.

ALIZARIN DYE.

SPECIFICATION forming part of Letters Patent No. 790,079, dated May 16, 1905.

Application filed February 24, 1905. Serial No. 247,189.

*To all whom it may concern:*

Be it known that we, ROBERT E. SCHMIDT, doctor of philosophy, chemist, and ARNOLD FISCHER, chemist, residing at Elberfeld, Germany, (assignors to the FARBENFABRIKEN OF ELBERFELD Co., of New York,) have invented a new and useful Improvement in New Dyes; and we hereby declare the following to be a clear and exact description of our invention.

Our invention relates to the manufacture of a new dyestuff of the anthracene series, which can be obtained by treating with formic aldehyde in acid solution the so-called "alizarin-blue," (dioxyanthraquinonequinolin obtainable by the action of glycerin and sulfuric acid on beta-nitroalizarin.)

In carrying out the process practically we can proceed as follows, the parts being by weight: Eight parts of a forty-per-cent. formic-aldehyde solution are added to a solution of ten parts of dry alizarin-blue in one hundred and fifty parts of sulfuric acid (66° Baumé) while stirring. The temperature must not be permitted to rise above 50° centigrade. The reaction mass is then heated at 70° centigrade until a test portion poured into water and mixed with an excess of ammonia shows no longer the blue color of alizarin-blue, but a green color being changed no more by further heating the reaction mass. It is then poured into water, and the precipitate thus obtained is filtered off and washed with water until neutral. The new dyestuff thus obtained is when dried and pulverized a dark powder, soluble in concentrated sulfuric acid with a reddish brown and in caustic-soda lye and ammonia with a green color. It combines with alkaline bisulfites yielding compounds which are soluble in water and which produce from gray to black level shades on being printed on cotton along with chrome mordants, such as acetate of chrome or the like. The above-described process can also be carried out at a lower temperature, (at about from 30° to 35° centigrade.)

Having now described our invention and in what manner the same is to be performed, what we claim as new, and desire to secure by Letters Patent, is—

The herein-described new dyestuff of the anthracene series obtainable by treating alizarin-blue in acid solution with formic aldehyde, which dyestuff is, after being dried and pulverized, a dark powder soluble in concentrated sulfuric acid with a reddish-brown color and being dissolved by ammonia and caustic-soda lye with a green color; combining with alkaline bisulfites yielding compounds which are soluble in water and which produce from gray to black level shades on being printed on cotton along with acetate of chrome, substantially as hereinbefore described.

In testimony whereof we have signed our names in the presence of two subscribing witnesses.

ROBERT E. SCHMIDT.
ARNOLD FISCHER.

Witnesses:
OTTO KÖNIG,
J. A. RITTERSHAUS.